United States Patent [19]

Takeuchi et al.

[11] Patent Number: 5,023,887
[45] Date of Patent: Jun. 11, 1991

[54] DATA TRANSMISSION SYSTEM USING SPREAD SPECTRUM COMMUNICATION

[75] Inventors: Kunihiko Takeuchi, Kawasaki; Masao Oba; Shinichi Horinouchi, both of Yokohama, all of Japan

[73] Assignee: Tokyo Keiki Company Ltd., Tokyo, Japan

[21] Appl. No.: 478,502

[22] Filed: Feb. 12, 1990

[30] Foreign Application Priority Data

Mar. 2, 1989 [JP] Japan .................................. 1-50814

[51] Int. Cl.$^5$ ............................................. H04K 1/00
[52] U.S. Cl. ............................................. 375/1; 380/50
[58] Field of Search ............... 375/1; 380/48–50, 380/33, 34, 44–47

[56] References Cited

U.S. PATENT DOCUMENTS

| | | | |
|---|---|---|---|
| 4,864,589 | 9/1989 | Endo | 375/1 |
| 4,903,279 | 2/1990 | Murakami et al. | 375/1 |
| 4,932,057 | 6/1990 | Kolbert | 380/33 |

Primary Examiner—Stephen C. Buczinski
Assistant Examiner—Bernarr Earl Gregory
Attorney, Agent, or Firm—Wenderoth, Lind & Ponack

[57] ABSTRACT

In response to a bit transfer request from one of two units, bit data is transmitted bit by bit from the other of the two units. The unit on the transmission side for transmitting the bit data has an M-series generator. In response to bit 1, a first $M_0$-series signal of a 63-word length is generated. In response to bit 0, a second $M_0$-series signal in which the series start position is set to the intermediate position of the first $M_0$-series signal, although the signal is the same $M_0$-series signal of the 63-word length, is generated. The unit on the reception side has previously stored the first and second $M_0$-series signals on the transmission side as reference signals, and calculates the correlations between the two reference signals and the reception signal, and demodulates the data bit corresponding to the reference signal having a larger correlation value.

8 Claims, 4 Drawing Sheets

FIG.2

|      | b5 | b4 | b3 | b2 | b1 | b0 |
|------|----|----|----|----|----|----|
| m01  | 1  | 1  | 1  | 1  | 1  | 1  |
| m02  | 0  | 1  | 1  | 1  | 1  | 1  |
| m03  | 0  | 0  | 1  | 1  | 1  | 1  |
| ...  |    |    |    |    |    |    |
| m26  | 0  | 1  | 1  | 1  | 1  | 0  |
| m27  | 1  | 0  | 1  | 1  | 1  | 1  |
| ...  |    |    |    |    |    |    |
| m63  | 1  | 1  | 1  | 1  | 1  | 0  |

M01 SERIES SIGNAL

M27 SERIES SIGNAL

DATA TRANSMISSION SYSTEM USING SPREAD SPECTRUM COMMUNICATION

BACKGROUND OF THE INVENTION

The present invention relates to a data transmission system for effecting data transmission in a contactless manner between units which are arranged at separate positions by using a spread spectrum communication technique and, more particularly, to a data transmission system for effecting data transmission between units by using two kinds of M-series signals.

In recent years, in association with the practical use of factory automation systems, there has been considered a system in which working programs, working data, and the like which are used in a controller of a machining center or the like are stored in a memory module provided in a pallet to which a workpiece is attached, and when the pallet is conveyed to the machining center, the content of the memory module is automatically read out and loaded into the controller.

It is preferable that the above noted data transmission system for use in a factory automation system is constructed as a contactless transmission system. For this purpose, three kinds of contactless transmission systems such as radio wave systems, photo coupling systems, and electromagnetic induction coupling systems have been proposed.

However, in the radio wave system, since microwaves are used, the installation conditions of peripheral apparatuses are limited due to a problem of the reflection or the like. In the photo coupling system, there is a problem of fouling by an oil or a dust. Thus, in recent years, attention has been paid to the electromagnetic induction coupling system which can be stably used at a location having severe environmental conditions.

However, in the electromagnetic induction coupling system in which the data transmission is effected between two units by disposing the induction coils provided in the two units near each other, since the system is what is called a transformer coupling type system, the magnetic force deteriorates in inverse proportion to the cube of the distance. Thus, if the interval between the coils is not reduces to a few millimeters of less, stable data communication in a factory where a large amount of external noise exist cannot be guaranteed. With respect to a point that the two units must be disposed near each other until the distance there-between is about a few millimeters, such a drawback is significant in the electromagnetic induction coupling system as compared with the radio wave system and the photo coupling system in which the transmission distances can be set to be relatively large and become a cause of the delay of the realization of the practical use.

Therefore, the inventors of the present invention have proposed a system for significantly increasing the transmission gap interval by applying a spread spectrum communication technique to the electromagnetic induction coupling system in U.S. patent application Ser. No. 07,387,966 (1989).

For instance, two kinds of M-series generators are prepared on the transmission side and different M-series signals are transmitted in accordance with the data bits 0 and 1. On the reception side, the two M-series signals on the transmission side are stored as reference values in a memory and after the reception signals were sampled at a predetermined period, the correlation calculations are sequentially executed in parallel between the sampled reception signals and each of the two M-series reference values. Then, the two calculated correlation values are compared. Since the correlation value in which the reception signal and the series of the reference value coincide is larger than the correlation value in which the reception signal and the reference value series differ, the data bit 0 or 1 corresponding to the reference value used in the calculation of the larger correlation value is output.

In a data transmission system in which the presence or absence of the auto-correlation between the reception signal and the reference values is calculated by using the two kinds of M-series signals as mentioned above, the correlation value in the case where any one of the signal arrangements has deviated is much smaller than the correlation value in the case where the arrangements coincide between the same two M-series signals. The S/N ratio of the reception signal when they coincide with the reception signal when they differ is fairly high. That is, in the M series of a word length of $2^N - 1$, when the series has deviated by one stage, the correlation value is reduced to $-1/(2^N - 1)$.

However, since the mutual correlation of the two kinds of M-series signals is calculated with respect to the reception signal of the M-series which is different from the reference value, the derived correlation value is dependent upon the series position. A satisfactory S/N ratio in the auto-correlation is not guaranteed.

On the other hand, since two kinds of M-series signals are generated in correspondence with the data bits 1 and 0, there is a problem in that two M series generating circuits are necessary and the circuit construction also becomes complicated.

SUMMARY OF THE INVENTION

It is an object of the present invention to provide a data transmission system using a spread spectrum communication technique in which data bits 1 and 0 are transmitted by a single M-series signal and a S/N ratio by the auto-correlation is guaranteed.

Another object of the invention is to provide a data transmission system using a spread spectrum communication technique in which a circuit construction to generate an M-series signal can be simplified.

Still another object of the invention is to provide a data transmission system using a spread spectrum communication technique in which the contactless coupling distance by the electromagnetic induction coupling between two units can be lengthened.

Still another object of the invention is to provide a data transmission system in which the data transmission is effected between a write/read unit and a portable memory module.

Still another object of the invention is to provide a data transmission system in which a spread spectrum communication technique is used in the data transmission from a memory module to a write/read unit.

That is, the present invention relates to a data transmission system having two units in which each time a bit transfer request is received from one of the units, bit data is transmitted bit by bit from the other unit.

With respect to the above data transmission system, according to the present invention, first, the unit on the transmission side of the data bits is provided with an M series generator for generating an M-series signal, for instance, an $M_O$ series signal having a predetermined word length, for instance, a 63-word length and a specified arrangement order in correspondence to one logic of the data bits, for instance, the data bit 1 and for generating the same M-series signal in which the intermediate position of the M-series signal is set to a start position, for instance, in the case of the 63-word length, the position of the 27-word length is set to the start position in correspondence to the other logic of the data bit, for instance, the data bit 0.

On the other hand, the unit on the reception side of the data bits is provided with: a first correlating circuit for calculating the correlation between a reception signal and an M-series signal which is equal to one of the signals on the transmission side which was stored as a reference value in a memory; a second correlating circuit for calculating the correlation between the reception signal and an M-series signal which is equal to another signal on the transmission side which was stored as a reference value in the memory and in which the intermediate position is set to the start position; and a discriminating means for comparing the magnitudes of correlation values as outputs of the first and second correlating circuits, thereby discriminating the logic (0 or 1) of the data bits.

The M-series generator comprises: a shift register having the number of shift stages corresponding to a predetermined word length, for instance, a shift register having six shift stages in the case of a 63-word length ($2^6-1$); a gate circuit for calculating the exclusive OR (EX-OR) of outputs of two predetermined shift stages of the shift register and for supplying the calculated result to the input shift stage; and a loading circuit for loading an initial value, for instance, "111111" to generate the M-series signal having a predetermined arrangement order into the shift register when one (bit 1) of the data bits is transmitted and for loading an initial value, for example, "101111" which is near the central position where the peak of the correlation value with the M-series signal having the initial value "111111" is apart by the longest distance and in which a bit change with the above-mentioned initial value is small when the other logic (bit 0) of the data bits is transmitted.

In the data transmission system of the present invention as mentioned above, the same M-series signal is generated in correspondence to the data bits 1 and 0 from different start positions. Therefore, by selectively switching the loading operation of the initial value to decide the start position of the M-series in accordance with the data bit, two kinds of M-series signals can be generated by a single M-series generator. On the other hand, the initial value is selected so as to minimize the bit change between the two M-series in which the start positions are different. Thus, the circuit construction can be simplified.

On the other hand, in the correlation calculation, the auto-correlation between the same two M-series is merely calculated and the correlation with the other M-series is not calculated. Therefore, by subtracting $1/(2^N-1)$ from the correlation value in the case where the series are deviated for the peak value in the case where the series coincide, a satisfactory S/N ratio of the reception signal can be guaranteed and the transmission errors can be minimized.

The above and other objects, features, and advantages of the present invention will become more apparent from the following detailed description with reference to the accompanying drawings.

BRIEF DESCRIPTION OF THE DRAWINGS

FIG. 2 is an explanatory diagram of M-series signals which are used in the invention;

DETAILED DESCRIPTION OF THE PREFERRED EMBODIMENT

Figure 1:
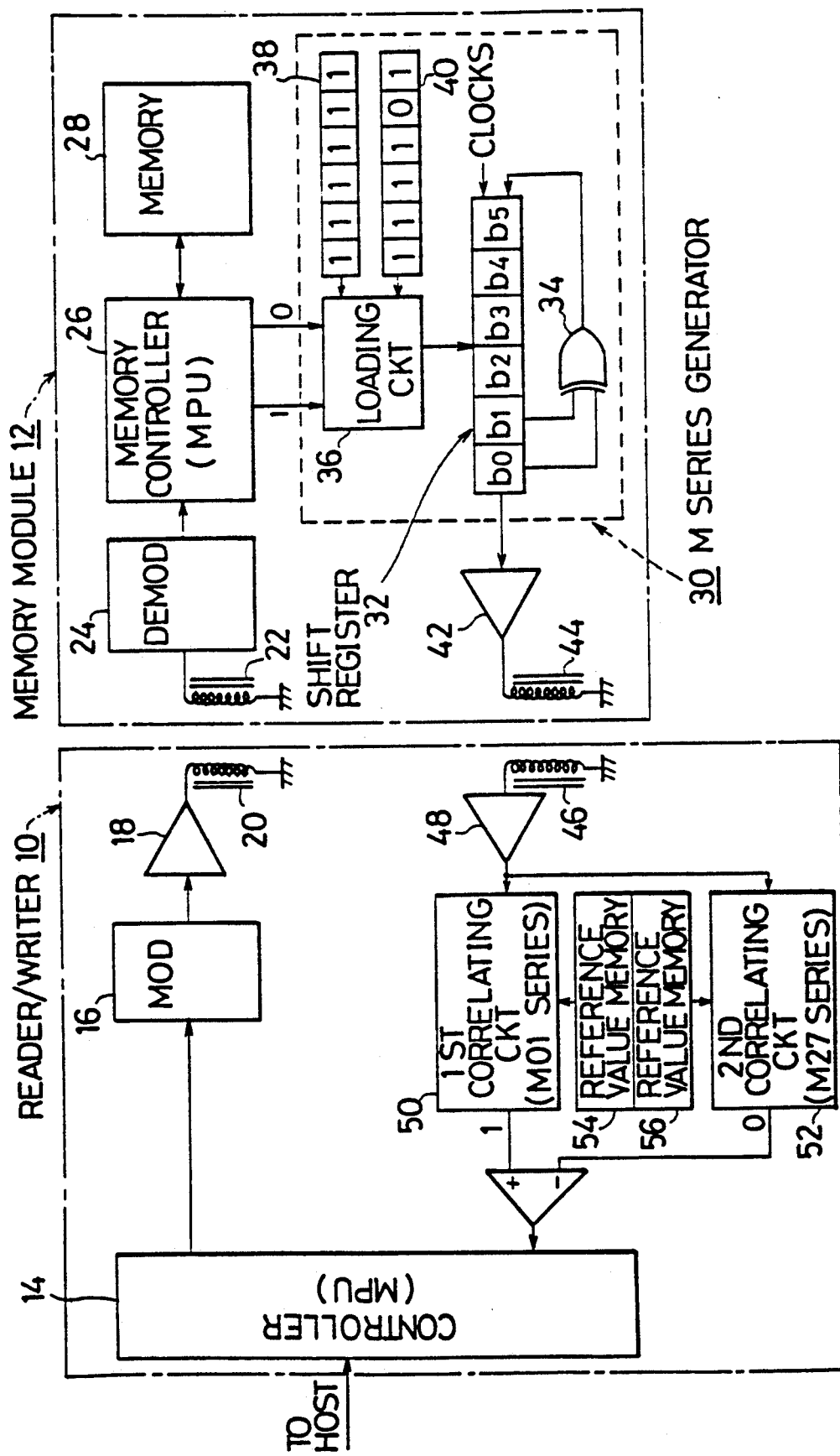
FIG. 1 is a constructional diagram showing an embodiment of the present invention.

In FIG. 1, reference numeral 10 denotes a reader/writer and 12 indicates a memory module. The reader/writer 10 is installed in a machining center or the like in, e.g., a factory automation system. On the other hand, the memory module 12 is provided for a pallet to which a workpiece is attached and which is disposed in a pallet yard. When the pallet is conveyed to the machining center, working programs, working data, or the like stored in the memory module 12 are read out by the reader/writer 10 and are loaded into a control side of the machining center.

The reader/writer 10 has a controller 14 to execute a read access or a write access by a command from a host computer. Transmission data from the controller 14 to the memory module 12 is fed to a modulating circuit 16 and is frequency modulated by the modulating circuit 16. The frequency modulated signal is amplified by an amplifier 18 and, thereafter, it is supplied to an induction coil 20 for transmission.

An induction coil 22 for reception is provided on the side of the memory module 12 so as to face the transmitting induction coil 20 of the reader/writer 10. A reception signal induced in the induction coil 22 is demodulated into the original data bits by a demodulating circuit 24 and is fed to a memory controller 26. When the write access is received from the side of the reader/writer 10, the memory controller 26 enables a memory 28, thereby allowing write data which is sent subsequently to the write access to be written into a designated address in the memory 28. On the other hand, when a read access is received from the reader/writer 10 side, the memory controller 26 reads out the data stored in the address in the memory 28 which was designated by the read access. Then, the memory controller 26 transmits the read data bit by bit to the reader/writer 10 side each time the bit transfer request is generated from the reader/writer 10 side.

A non-volatile memory such as an EEPROM or the like is used as the memory 28. As a power supply to the memory module 12, the signal induced in the induction coil 22 is rectified by a rectifying circuit (not shown) and an operating electrical power output is obtained, so that a battery is unnecessary.

In the embodiment of FIG. 1, M-series signals are transmitted with respect to the one-bit transmission which is executed in the memory module 12 each time the bit transfer request is generated from the reader/writer 10, the correlation is calculated on the reception side, and the transmission bits are demodulated.

The read bit output 1 or 0 from the memory controller 26 is fed to an M-series generator 30.

The M-series generator 30 generates the $M_0$ series signal of, for instance, a 63-word length ($=2^6-1$). That is, since the M-series generator 30 generates the $M_0$ series signal of the 63-word length, the generator 30 comprises: a shift register 32 of six stages composed of shift bits $b_0$ to $b_5$; and an EX-OR gate 34 for receiving outputs of two shift stages $b_0$ and $b_1$ on the output side of the shift register 32, and for calculating the exclusive OR thereof, and for supplying the calculation result to the input shift stage $b_5$.

Either the initial value [111111] which was set in a setting device 38 and the initial value [101111] which was set in a setting device 40 is loaded as an initial value into the shift register 32 by a loading circuit 36. That is, when the data bit 1 is fed from the memory controller 26 to the loading circuit 36, the loading circuit 36 sets the initial value of the setting device 38 to the shift register 32 and supplies a shift clock to the input stage of the shift register 32, thereby generating the first $M_0$-series signal of the 63-word length.

On the other hand, when the data bit 0 is fed from the memory controller 26 to the loading circuit 36, the loading circuit 36 loads the initial value which was set in the setting device 40 to the shift register 32. In a manner similar to the above, the second $M_0$-series signal in which the series start position differs although it is the same $M_0$-series signal is generated by the shifting operation by the shift clock.

An output of the M-series generator 30 is supplied to an induction coil 44 for transmission through an amplifier 42.

An induction coil 46 for reception is provided for the reader/writer 10 side so as to face the induction coil 44 for transmission. A signal induced in the induction coil 46 is amplified by an amplifier 48 and, thereafter, the amplified signal is supplied to a first correlating circuit 50 and a second correlating circuit 52.

In order to discriminate the reception of the first $M_0$-series signal having a specified arrangement order which is sent by loading the initial value [111111] into the shift register 32, the first correlating circuit 50 executes the correlation calculation between the reception signal obtained from the amplifier 48 and a reference value (of the first $M_0$-series signal) stored in a reference value memory 54.

On the other hand, in order to discriminate the reception of the second $M_0$-series signal in which the start position differs from that of the first $M_0$-series signal and which has a specified arrangement order and which is generated by loading the initial value [101111] into the shift register 32, the correlating circuit 52 executes the correlation calculation between the reception signal obtained from the amplifier 48 and a reference value (of the second $M_0$-series signal) stored in a reference value memory 56. Outputs of the correlating circuits 50 and 52 are fed to a comparator 66. The correlation values obtained by the correlating circuits 50 and 52 are compared, thereby demodulating the data bit 1 or 0.

The two kinds of M-series signals which are generated by the M-series generator 30 provided for the memory module 12 in FIG. 1 will now be described with reference to FIG. 2.

FIG. 2 is an explanatory diagram showing the generation principle by the shift register 32 of the $M_0$-series of a word length of 63 ($=2^6-1$) words.

In FIG. 2, as an initial value to generate the $M_0$-series signal, [111111] is set into the shift register of six bits consisting of $b_0$ to $b_5$. In this state, when shift clocks are sequentially supplied from the outside to the input shift stage $b_5$ of the shift register 32, sixty-three shift register states shown by $m_{01}$ to $m_{63}$ in FIG. 2 are formed. That is, each time the shift clock is input, the $b_0$ bit is output to the outside and the exclusive OR between the $b_0$ bit and the $b_1$ bit is calculated and extracted by the EX-OR gate 34 and is fed to the input bit $b_5$. By repeating the foregoing operation by the shift clock sixty-three times, the content of the shift register 32 finally becomes $$b_5b_4b_3b_2b_1b_0=111110$$

Further, when the shift clock is input, the content of the shift register 32 is again returned to the initial state of [111111].

The signal series comprising a frame surrounded by a solid line of the $b_0$ bit locating at the output state is set to the first $M_0$-series signal of the 63-word length which gives the inherent $M_0$ series for a change in shift register state shown in FIG. 2. That is, by loading the initial value [111111] into the shift register 32 by the loading circuit 36 corresponding to the data bit 1, the inherent M-series signal as the first $M_0$-series is generated.

On the other hand, for the data bit 0, the initial value of $$b_5b_4b_3b_2b_1b_0=101111$$

is loaded into the shift register 32. This initial value indicates the shift register state at the 27 th arrangement position shown by $m_{27}$ in FIG. 2.

Assuming that the first $M_0$-series signal surrounded by the rectangular frame in FIG. 2 is set to $M_{01}$ and the second $M_0$-series signal which is generated from the 27 th arrangement position of the $M_{01}$-series signal is set to $M_{27}$, for the start position $m_{01}$ of the inherent $M_{01}$-series signal, the start position $m_{27}$ of the $M_{27}$ series signal which is separately generated is set to the intermediate position of the $M_{01}$-series.

That is, the positional deviation of twenty-six series in the $M_0$-series is provided between the $M_{01}$-series signal and the $M_{27}$-series signal.

The reason why the $M_{01}$-series signal which starts from the initial value of the inherent $M_0$-series signal and the $M_{27}$-series signal which starts from the central position $m_{27}$ of the inherent $M_0$-series are used is to guarantee that in the correlation calculation between the $M_{01}$-series signal and the $M_{27}$-series signal, the deviation value from the peak value when the series coincide is set to $-1/(2^N-1)$. On the other hand, the bit change between the initial values [111111] and [101111] corresponds to one bit in which only one bit position differs, thereby simplifying the loading circuit 36.

Figure 3:
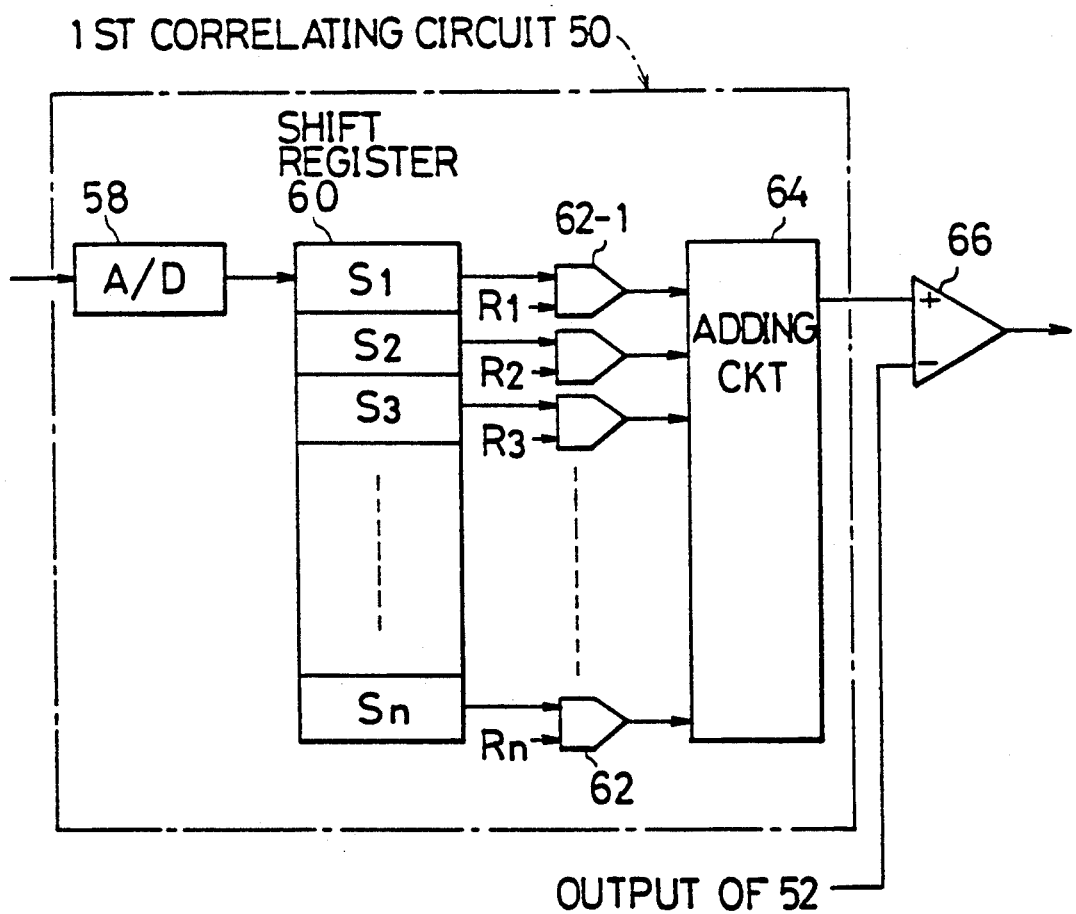
FIG. 3 is a constructional diagram of an embodiment of a correlating circuit to calculate the correlation of the reception M-series in FIG. 1.

FIG. 3 is a constructional diagram showing a practical embodiment of the first correlating circuit 50 provided for the reader/writer 10 shown in FIG. 1. The second correlating circuit 52 also has substantially the same circuit construction except the reference value.

In FIG. 3, the reception signal received by the induction coil 46 is amplified by the amplifier 48. Thereafter, the amplified signal is sampled by an A/D converter 58 and sequentially stored as sampling data $S_1$ to $S_n$ into a shift register 60.

Now, assuming that the generation period of the $M_{01}$-series signal corresponding to the data bit 1 of the 63-word length which is generated from the M-series generator 30 is set to 63 μsec, the sampling period of the A/D converter 58 is set to, for instance, 100 nsec. Thus, 630 sample data units are stored in the shift register 60 per $M_{01}$-series signal.

Multipliers 62-1 to 62-n of the number n corresponding to the number n of stages of the shift register 60, e.g., n=630 stages are provided after the shift register 60. Reference values $R_1$ to $R_n$ of the $M_{01}$-series signal divided into the 630 data as many as the number of sampling times which were stored in the reference value memory 54 are respectively input to the multipliers 62-1 to 62-n and are multiplied by the sampling data $S_1$ to $S_n$.

Outputs of the multipliers 62-1 to 62-n are fed to an adding circuit 64 and the correlation values are obtained by the addition of all of the multiplication outputs.

Thus, the first correlating circuit 50 shown in FIG. 3 executes the correlation calculation of the following equation.

$$C(T) = \Sigma S(n) \cdot R(n)$$

where,
S(n):sampling data
R(n):reference value data

On the other hand, the second correlating circuit 52 operates in a manner similar to the first correlating circuit 50 except for the fact that a different point other than that of the $M_{27}$-series signal in which the intermediate position of the $M_{01}$-series signal is set to the start position and is divided into 630 values corresponding to the number of sampling times and fed as reference values to the multipliers 62-1 to 62-n shown in FIG. 3. The two correlation values are compared by the comparator 66. If the former correlation value is larger as the result of the comparison, the data bit 1 is output. If the latter correlation value is larger, the data bit 0 is output.

On the other hand, the correlation calculations in the first and second correlating circuits 50 and 52 are actually executed by the program process of the computer. For the time interval when the bit transfer request is output from the reader/writer 10 to the memory module 12 and the $M_{01}$-series signal or $M_{27}$-series signal is actually received, the reception data is sampled by the A/D converter 58 and stored into the shift register 60. After that, the correlation calculation is executed by using both the sampling data in the shift register 60 and the reference values in the reference value memory.

Figure 4:
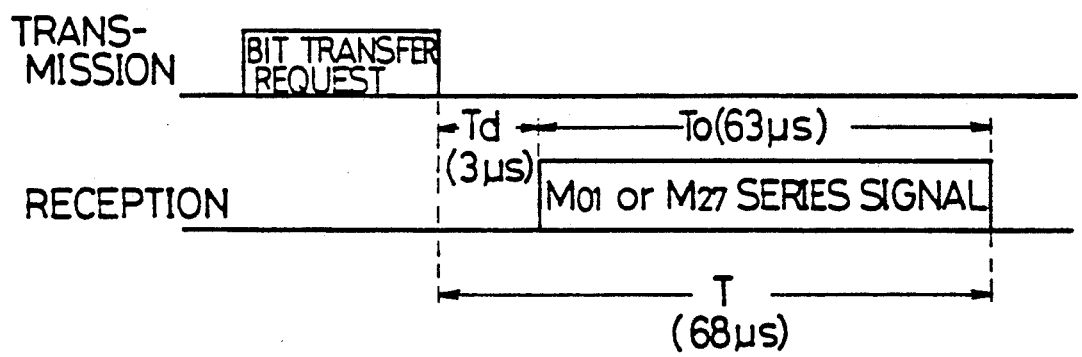
FIG. 4 is a timing chart showing a transmission delay of the M-series signals for a bit transfer request.

However, in the actual data transmission, as shown in FIG. 4, a transmission delay time $\rho_d$ occurs for the time interval after the bit transfer request was output from the reader/writer 10 to the memory module 12 until the $M_{01}$-series signal of $M_{27}$-series signal is actually received. The transmission delay time $\tau_d$ differs depending on the reader/writer 10 and memory module 12 and the transmission delay time $\tau_d$ of the largest delay time as a system, for instance, $\tau_d = 3$ μsec is merely guaranteed.

Therefore, not only the single $M_0$-series signal or $M_{27}$-series signal for 63 μsec but also the sampling data of the time interval of, e.g., 68 μsec to which the transmission delay time $\tau_d = 3$ μsec was added are stored in the shift register 60 shown in FIG. 3. In this case, 630 reference value data are provided for 680 sampling data in the shift register 60 and it is uncertain at which positions of 680 sampling data the 630 $M_{01}$ or $M_{27}$-series signals are located. Therefore, it is not known to execute the correlation calculation between which position in the shift register 60 and the reference value.

Figure 5:
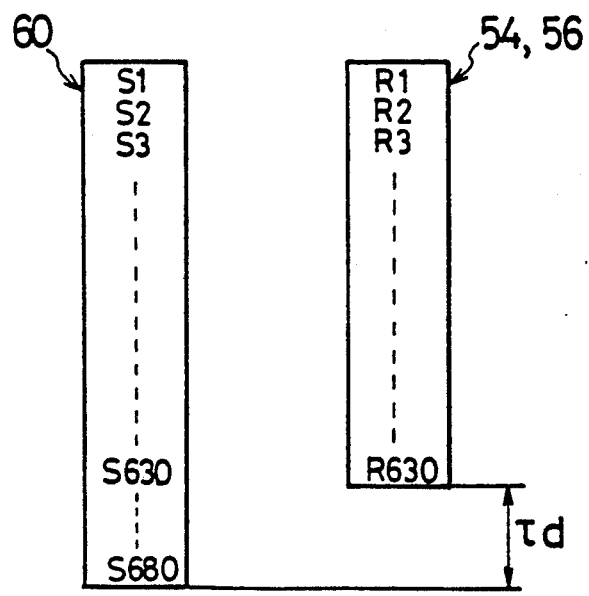
FIG. 5 is an explanatory diagram for the calculation of the correlation according to the present invention in consideration of the transmission delay.

That is, there are correspondence relationships shown in FIG. 5 between the sampling data in the shift register 60 and the reference data in the reference value memories 54 and 56.

Therefore, with respect to the correlation calculation, for instance, the reference value side is sequentially shifted data bit by data bit for the sampling data in the shift register 60 and the correlation calculation is executed. For instance, the reference values $R_1$ to $R_{630}$ are first calculated for the sampling data $S_1$ to $S_{630}$. Then, the correlation calculations of the reference values $R_1$ to $R_{630}$ are executed for the sampling data $S_1$ to $S_{631}$. In a manner similar to the above, the reference values $R_1$ to $R_{630}$ are sequentially shifted and the correlation calculations are performed with respect to the remaining data of the delay time $\tau_d$.

By the foregoing correlation calculations, even if the $M_{01}$ or $M_{33}$-series signal of one series exists at any position in the shift register 60, the correlation value having the peak value which coincides with the reference value can be calculated.

In the correlation calculations in FIG. 5, the reference value side is shifted bit by bit. However, it is also possible to similarly execute the correlation calculations by fixing the reference value side and by sequentially shifting the sampling data.

As shown in FIG. 4, the $M_{01}$ or $M_{27}$-series signal exists at a proper position in a time interval of T in which a generation time $T_0$ of the M-series signal of one series was added to the delay time $\tau_d$. However, when the delay time $\tau_d$ for the $M_{01}$ or $M_{27}$-series signal is short, the no-data period after the end of the $M_{01}$ or $M_{27}$-series signal becomes long. As mentioned above, when the data is sampled and the correlations between the sampled data and the reference values are calculated with respect to the no-data period in the case where the delay time $\tau_d$ is short, the inherent auto-correlation is not calculated because no data exists for such a period of time, so that there is a fear such that a high S/N ratio is not guaranteed. Therefore, to eliminate the no-data period after completion of the generation of the $M_{01}$ or $M_{27}$-series signal, it is desirable that when the M-series signals are generated from the M-series generator 30 shown in FIG. 1, the subsequent portion of the same series signal corresponding to the transmission delay time $\tau_d$ is added after the $M_{01}$ or $M_{27}$-series signal and the resultant signal is transmitted.

The above noted embodiment has been described with respect to an example in the case where the read data from the memory module 12 side is transmitted in response to the read access from the reader/writer 10. However, the present invention is not limited to such an example. The invention can be directly applied to a proper data transmission system in which data is transmitted bit by bit between two units each time a bit transfer request is generated from one of the two units to the other unit.

Although the embodiment of FIG. 1 has been described with respect to the electromagnetic induction coupling system using the induction coils, invention can be also directly applied to a system for transmitting data between two units by a radio communication as another embodiment of the present invention.

What is claimed is:
1. A data transmission system using a spread spectrum communication technique, comprising:
a first unit for requesting a bit transfer; and
a second unit for transmitting serial data bit by bit each time said second unit receives a bit transfer request from said first unit;

wherein said second unit has an M-series generating means for generating a first M-series signal having a predetermined word length in correspondence with one of two binary logic values of one bit of said serial data and for generating a second M-series signal in which a series start position differs although it is the same M-series signal as the first M-series signal in correspondence with the other of said two binary logic values of said one bit of said serial data;

and wherein said first unit has:

a first correlation calculating means for calculating a correlation between a reference signal which has previously been stored and is the same as said first M-series signal and a reception signal output from said second unit;

a second correlation calculating means for calculating a correlation between a reference signal which has previously been stored and is the same as said second M-series signal and said reception signal output from said second unit, and a discriminating means for comparing magnitudes of a first correlation value which was calculated by said first correlation calculating means and a second correlation value which was calculated by said second correlation calculating means, for thereby discriminating the logic value of the data bit of said reception signal, and for outputting said logic values.

2. A system according to claim 1, wherein said M-series generating means of said second unit generates said second M-series signal in which an intermediate position of said first M-series signal is set to a start position.

3. A system according to claim 1, wherein said M-series generating means comprises:

a shift register having shift stages of the number (N) corresponding to a predetermined word length $(2^N-1)$;

a gate circuit for calculating an exclusive OR of outputs of two predetermined shift stages in said shift register and for supplying a result of the calculation to the input shift stages; and a loading circuit for loading an initial value to generate an M-series signal having a predetermined arrangement order to said shift register when one of said two binary logic values of the data bits is transmitted and loading another initial value to generate the same M-series signal from an intermediate position when the other logic value of the data bits is transmitted.

4. A system according to claim 3, wherein, when the number N of shift stages of said shift registers is set to 6 and the exclusive OR of the outputs of said two shift stages of said shift register is calculated by said gate circuit and is supplied to the input shift stage so that said shift register generates an $M_0$-series signal, said loading circuit loads the shift bits of $$b_5b_4b_3b_2b_1b_0=111111$$

in correspondence with one of the logic values of the data bits and loads the shift bits of $$b_5b_4b_3b_2b_1b_0=101111$$

in correspondence the other logic value of the data bits.

5. A system according to claim 1, wherein said first correlation calculating means comprises:

an A/D converter for sampling the reception signal and A/D converting the sampled signal into digital data;

a shift register for storing the converted data of said A/D converter by at least an amount of only one word length of said first M-series signal;

a group of multipliers for multiplying each of the data stored in the shift register with each of the values of the first M-series signals of the same number which have previously been stored in a memory; and an adder for calculating the sum of outputs of said group of multipliers.

6. A system according to claim 1, wherein said second correlation means comprises:

an A/D converter for sampling the reception signal and A/D converting the sampled signal into digital data;

a shift register for storing the converted data of said A/D converter by at least an amount of only one word length of said second M-series signal;

a group of multipliers for multiplying each of the data stored in the shift register with each of the values of the second M-series signals of the same number which have previously been stored in a memory; and an adder for calculating the sum of outputs of said group of multipliers.

7. A system according to claim 1, wherein the first and second units include a pair of induction coils for effecting a signal transmission of the transfer request of the data bits and another pair of induction coils for transmitting the bit data in response to the bit transfer request.

8. A system according to claim 1, wherein said first unit is a reader/writer for writing or reading data in response to a command from a host, and said second unit is a portable memory module for writing or reading data into/from a memory in accordance with an access from the reader/writer.

* * * * *